US012413595B2

(12) United States Patent
Sivaswamy et al.

(10) Patent No.: US 12,413,595 B2
(45) Date of Patent: Sep. 9, 2025

(54) AUTHORIZATION OF SERVICE REQUESTS IN A MULTI-CLUSTER SYSTEM

(71) Applicant: INTERNATIONAL BUSINESS MACHINES CORPORATION, Armonk, NY (US)

(72) Inventors: Magesh Kumar Sivaswamy, Bangalore (IN); Rashmi Khanna, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 17/549,940

(22) Filed: Dec. 14, 2021

(65) Prior Publication Data

US 2023/0188531 A1    Jun. 15, 2023

(51) Int. Cl.
*H04L 9/40*      (2022.01)
*G06F 16/27*     (2019.01)

(52) U.S. Cl.
CPC ............ *H04L 63/105* (2013.01); *G06F 16/27* (2019.01)

(58) Field of Classification Search
CPC .............................. H04L 63/105; G06F 16/27
See application file for complete search history.

(56) References Cited

U.S. PATENT DOCUMENTS

| | | | |
|---|---|---|---|
| 8,474,018 B2 | 6/2013 | Mardikar et al. | |
| 8,935,757 B2 | 1/2015 | Srinivasan et al. | |
| 9,485,279 B2 | 11/2016 | Kirner et al. | |
| 9,923,928 B2 | 3/2018 | Kirner et al. | |
| 10,212,191 B2 | 2/2019 | Kirner et al. | |
| 10,983,769 B2 | 4/2021 | White | |
| 2008/0300787 A1* | 12/2008 | Zeng | G01S 13/931 701/301 |
| 2015/0128211 A1 | 5/2015 | Kirner et al. | |
| 2017/0026418 A1 | 1/2017 | Kirner et al. | |
| 2017/0329957 A1 | 11/2017 | Vepa et al. | |

(Continued)

FOREIGN PATENT DOCUMENTS

| | | |
|---|---|---|
| CN | 105684391 A | 6/2016 |
| CN | 116263818 A | 6/2023 |

(Continued)

OTHER PUBLICATIONS

Disclosed Anonymously. IP.com No. IPCOM000262202D, "System to Authenticate and Authorize Service-to-Service Communication Across Multiple Clouds", Publication Date: May 11, 2020, 5 pages.

(Continued)

*Primary Examiner* — Emmanuel L Moise
*Assistant Examiner* — Xiang Yu
(74) *Attorney, Agent, or Firm* — CHIP LAW GROUP

(57) ABSTRACT

A method includes receiving a dependency chain matrix from each of a plurality of service end points in a multi-cluster system converging the received dependency chain matrices into a converged data matrix, sharing the converged data matrix as a side car module to each of the plurality of service end points, receiving a service request by an external user or service for at least one of the plurality of service end points, validating an authorization for the service request based on the converged data matrix, and generating a label that is appended to the service request and passed downstream to the plurality of service end points.

20 Claims, 11 Drawing Sheets

(56) References Cited

U.S. PATENT DOCUMENTS

2018/0048638 A1    2/2018  Lewis et al.
2018/0167417 A1    6/2018  Kirner et al.
2019/0188742 A1*   6/2019  Vasudevan ..... G06Q 10/063112
2020/0034776 A1*   1/2020  Peran ..................... G06N 5/022
2020/0358754 A1*  11/2020  Nair ...................... H04L 63/083

FOREIGN PATENT DOCUMENTS

EP        3066815 A1    9/2016
JP     2023-088313 A    6/2023
WO    2015/066369 A1    5/2015

OTHER PUBLICATIONS

Jannot Denis, "Identity Federation for Multi-Cluster Kubernetes and Service Mesh", Retrieved from Internet: https://www.solo.io/blog/identity-federation-for-multi-cluster-kubernetes-and-service-mesh/, Sep. 22, 2020, 9 pages.

Kumar Piyush, "Istio Service Mesh: A Beginners Guide", Retrieved from Internet: https://www.loginradius.com/blog/ async/istio-service-mesh/, Dec. 7, 2020, 13 pages.

Mell, Peter, "The NIST Definition of Cloud Computing;" National Institute of Standards and Technology; Special Publication 800-145; Sep. 2011; 7 pages.

Saha Amit, "Authentication between microservices using Kubernetes identities", Published in Dec. 2020, Retrieved from Internet: https://learnk8s.io/microservices-authentication-kubernetes, 45 pages.

\* cited by examiner

Ingress Authorization Table : Cluster-1 (250)

| Label | Resource /v1/storage | Resource /v1/user | Resource /v1/monitor |
|---|---|---|---|
| Label:C1:221, C1:331 | RU | RUD | R |
| Label:C1:222 | R | CRU | CR |
| Label:C2:551 | R | R | R |

FIG. 4A

Ingress Authorization Table : Cluster-2 (260)

| Label | Resource /v1/cluster | Resource /v1/node | Resource /v1/network |
|---|---|---|---|
| Label:C2:551, C2:661 |  | RUD | R |
| Label:C2:552 | R | CRU | CR |
| Label:C1:221 | RU R | R | R |

FIG. 4B

AUTHORIZATION OF SERVICE REQUESTS IN A MULTI-CLUSTER SYSTEM

BACKGROUND

The present invention relates to authorization of service requests in multi-cluster systems. More specifically, the invention relates a method for instant label-based authorization over a service dependency chain in a micro-service based multi-cluster eco system. In large distributed multi-cluster container based micro-services eco systems, requests to service end points are typically generated either by a user or by another service. For a service request to be authorized by an end-point multiple micro-services may work as a group in sequence or parallel in the background to complete the request. A service request must pass the authorization check at every micro-service level in order to obtain authorization. This process can degrade the overall quality of service by wasting compute time, using excessive memory and network bandwidth, and causing a response delay. Thus, a system and method whereby this authorization process is improved would be well received in the art.

SUMMARY

An embodiment of the present invention relates to a method, and associated computer system and computer program product, for authorization of a service request in a multi-cluster system. One or more processors of a computer system receives a dependency chain matrix from each of a plurality of service end points in a multi-cluster system. The one or more processors of the computer system converges the received dependency chain matrices into a converged data matrix. The one or more processors of the computer system shares the converged data matrix as a side car module to each of the plurality of service end points. The one or more processors receive a service request by an external user or service for at least one of the plurality of service end points. The one or more processors of the computer system validate an authorization for the service request based on the converged data matrix. The one or more processors of the computer system generate a label that is appended to the service request and passed downstream to the plurality of service end points.

BRIEF DESCRIPTION OF THE DRAWINGS

FIG. 4A depicts a first dependency chain matrix for inter cluster authorization, in accordance with embodiments of the present invention.

FIG. 4B depicts a second dependency chain matrix for inter cluster authorization, in accordance with embodiments of the present invention.

DETAILED DESCRIPTION

Figure 1:
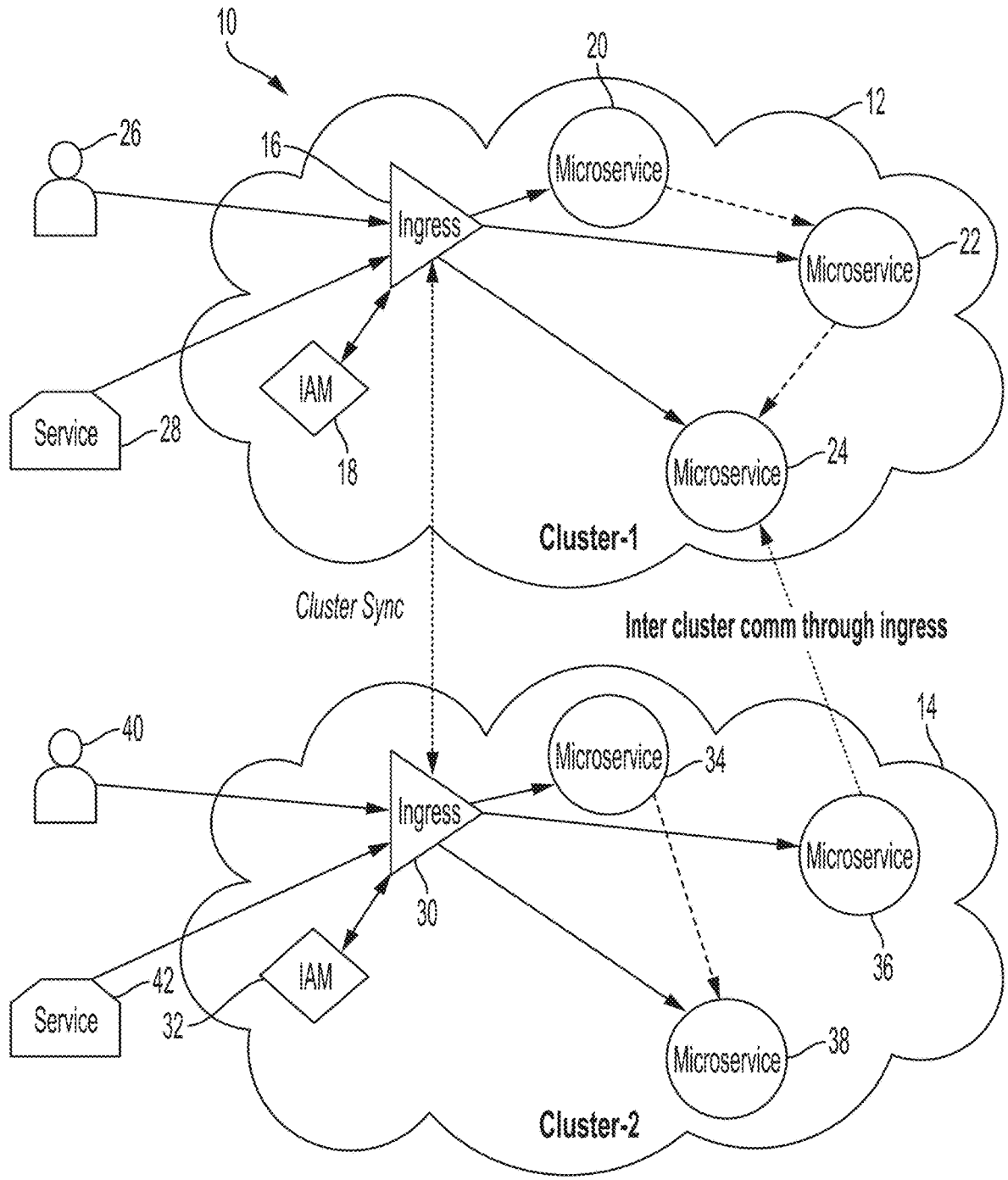
FIG. 1 depicts a schematic diagram of a system for authorization of a service request in a multi-cluster system, in accordance with embodiments of the present invention.

The present invention recognizes that the existing authorization for service requests in multi-cluster systems use policy enforcement points (PEP), policy decision points (PDP), policy information points (PIP) and policy administration points (PAP). In prior art processes, a user or an external service logs in and acquires a token (e.g. a JWT id token, an OAUTH access token, a saml token, etc) from an identity and access management system (IAM). The user or external service then attempts to access a protected resource from a service in a multi-cluster system. A PEP intercepts the request sending it to a PDP to verify that the user is authorized. Thereafter, the PDP evaluates the access policies related to this request (e.g. user info from the token of the user) and the PDP retrieves attributes related to the request from the PIP. Based on policy and the underlying attributes the user is granted access to the protected resource. Policies are created and managed by the PAP. The above process requires each micro service in the same cluster or outside in an integrated multi-cluster system to perform authorization checks independently based on a user's token. This process of authorizing a request occurs at every micro service entry point in a chain, which degrades the overall quality of service. Because micro services are independently developed by different teams and deployed, each of these services handle authorization independently, resulting in these problems. Thus, the present invention recognizes that new systems and methods which improves the quality of service would be well received.

The present invention contemplates service end points or micro services in a cluster to provide or publish to a centralized system for the cluster authorization level and operations-allowed information as part of the startup process for the service end points. This information may be received by the centralized system, which may be an ingress module for the cluster. The ingress module may review the received data from the service end points and compile, generate or aggregate a dependency chain matrix for every service end point the cluster supports. This dependency chain matrix is shared with a side-car module of every service in the cluster in advance and also whenever there is a change in the service endpoint access privileges. When a request comes in, it is contemplated that the ingress is be configured to validate the authorization and generate the right label which is appended to the original request and passed down stream. Only the centralized system (i.e. ingress module) may have the authority to attach a label to a request in this manner. Hence, all requests may go through this centralized system or ingress module. If any malformed or misbehaving service attempts to directly send a request to another service without going through the centralized system, the services side car module would detect a missing label and deny the request, thereby maintaining overall system integrity.

FIG. 1 depicts a schematic diagram of a system 10 for authorization of a service request in a multi-cluster system, in accordance with embodiments of the present invention. The system 10 includes a first cluster 12 and a second cluster 14. The first cluster 12 includes an ingress computer system 16, which may be considered an ingress module, that is connected to an identity and access management systems 18. The ingress computer system 16 is further shown in communication with microservices 20, 22, 24. An external user 26 is shown connected to the first cluster 12, and in particular to the ingress computer system 16 thereof. Similarly, an external service 28 is also shown connected to the first cluster 12, and in particular to the ingress computer system 16 thereof.

Similar to the first cluster 12, the second cluster 14 includes an ingress computer system 30 which may be considered an ingress module, that is connected to an identity and access management systems 32. The ingress computer system 30 is further shown in communication with microservices 34, 36, 38. An external user 40 is shown connected to the second cluster 14, and in particular to the ingress computer system 30 thereof. Similarly, an external service 42 is also shown connected to the second cluster 14, and in particular to the ingress computer system 30 thereof.

The respective access management systems 20, 22 of the first and second clusters 12, 14 may be incorporated into the respective ingress computer systems 16, 18, or may be separate devices, servers, or computer systems from the respective ingress computer systems 16, 18. While only two clusters 12, 14 are shown, systems contemplated herein may include many clusters. Moreover, as shown each of the clusters 12, 14 includes three microservices each, however more or less microservices for each cluster are contemplated. As shown the various microservices may be in communication with one or more other microservices in the same cluster, or even in different clusters. Further, as shown, the ingress computer systems 16, 18 are in operable communication, as described hereinbelow.

Figure 2:
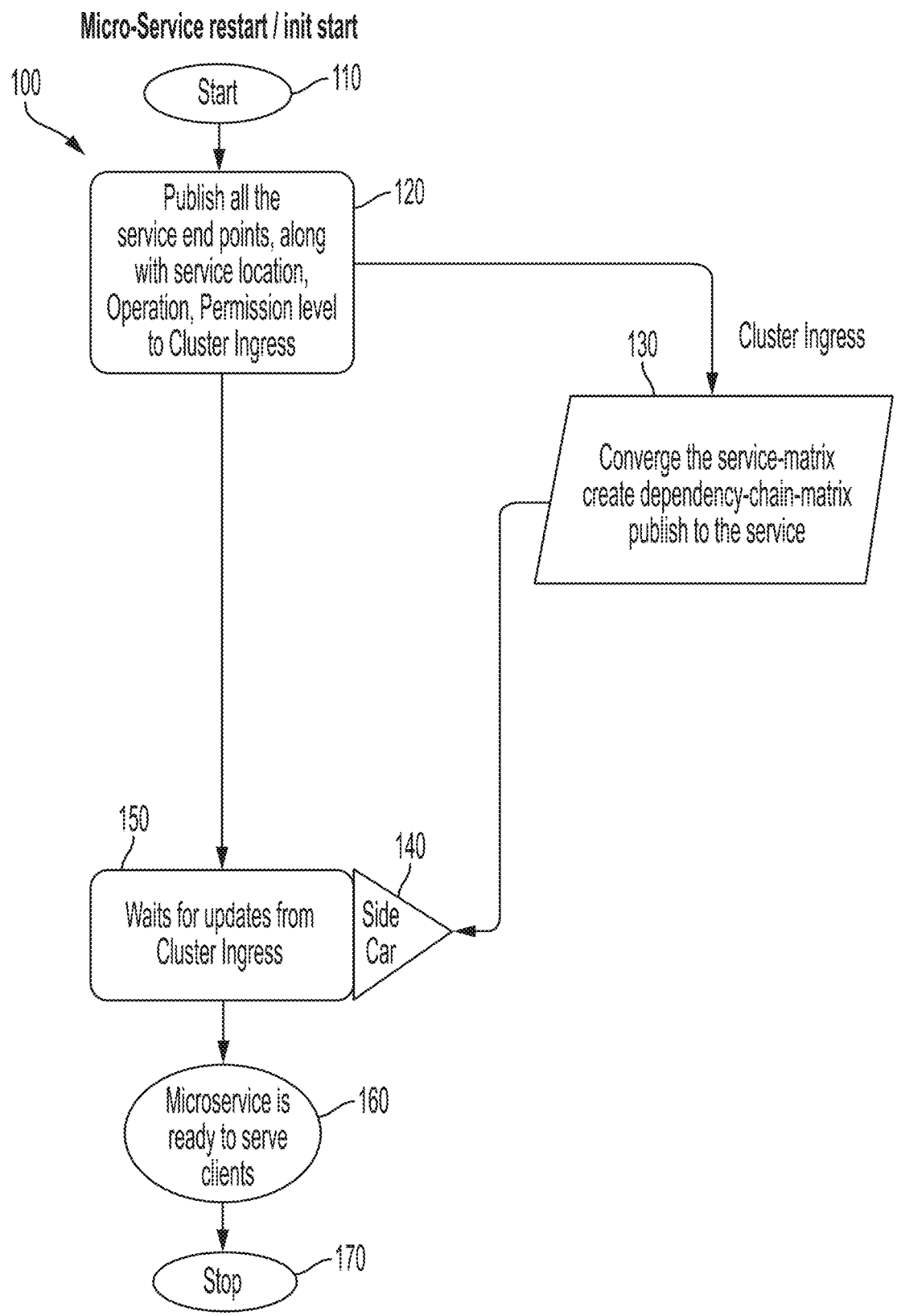
FIG. 2 depicts a process flow of a method of authorization of a service request in a multi-cluster system using the system of authorization of a service request in a multi-cluster system of FIG. 1, in accordance with embodiments of the present invention.

FIG. 2 depicts a process flow 100 of a method of authorization of a service request in a multi-cluster system using the system of authorization of a service request in a multi-cluster system of FIG. 1, in accordance with embodiments of the present invention. As shown, the process steps on the left indicate steps initiated by a service or microservice in a cluster. However, these steps may include additional steps such as receiving information performed by other elements of the cluster, such as an ingress module or computer system. Similarly, the process steps on the right indicate steps initiated by an ingress module or computer system in the cluster.

As shown, the process flow 100 begins at a step 110, whereby a system is presented, such as the system 10. According to the process flow 100, at a step 120 the various microservices or services in a cluster publish information comprising a service matrix to an ingress computer system. This information may include service end point information, service location, operation and permission level. This information is received by the ingress module or computer system of the cluster. At step 130, the ingress converges the service matrices received to create a dependency chain matrix for publication back to the microservices or services in the cluster as a side car. The cluster ingress then publishes this dependency chain matrix as a sidecar 140 for each of the microservices or services in the cluster. At step 150, the microservices or services wait for updates from the cluster ingress. Upon receiving the side car of the dependency chain matrix, the microservices or services may then be ready to serve clients at a step 160, according to the methods described herein. As shown, the process flow 100 ends at a step 170.

Figure 3A:
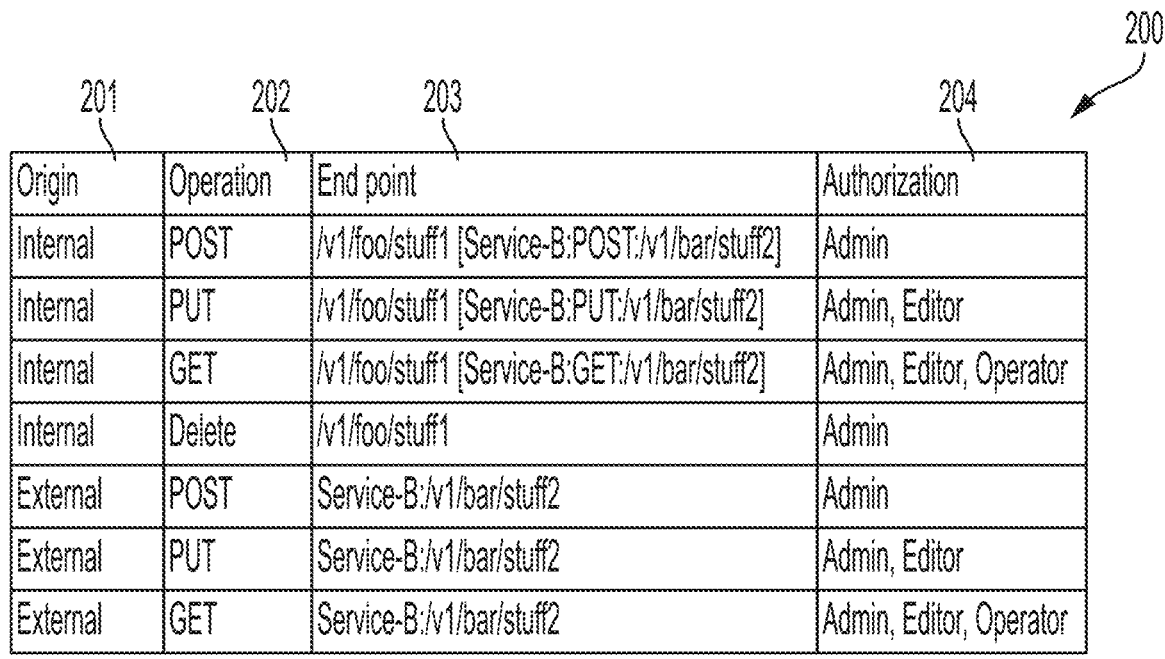
FIG. 3A depicts a first service matrix, in accordance with embodiments of the present invention.

FIG. 3A depicts a first service matrix 200, in accordance with embodiments of the present invention. The first service matrix 200 may represent a service matrix of the microservice 20 shown in FIG. 1. This information may be provided, published, transmitted or otherwise sent to the ingress computer system 16 for converging with other service matrices from other microservices or services, such as the microservices 22, 24. The first service matrix 200 includes four columns of information, a first column 201 indicating an origin of a service request, a second column 202 indicating an operation being requested, a third column 203 being an end point of the request, and a fourth column 204 indicating which categories of operators have authorization. As shown, the first service matrix 200 includes authorization processes for internal and external origin service requests.

Figure 3B:
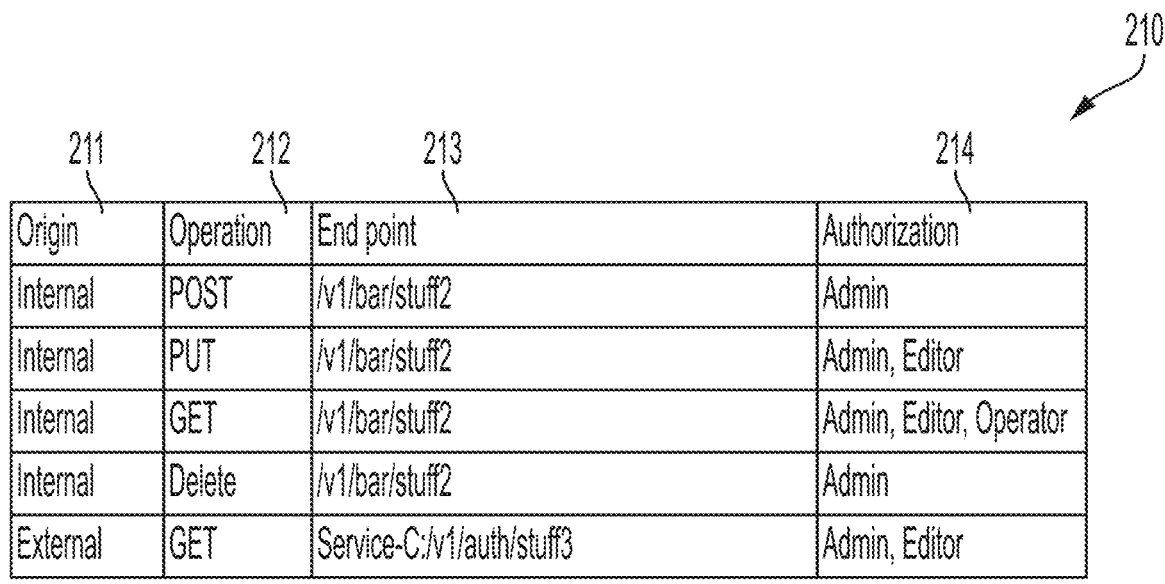
FIG. 3B depicts a second service matrix, in accordance with embodiments of the present invention.

FIG. 3B depicts a second service matrix 210, in accordance with embodiments of the present invention. The second service matrix 210 may represent a service matrix of the microservice 22 shown in FIG. 1. This information may be provided, published, transmitted or otherwise sent to the ingress computer system 16 for converging with other service matrices from other microservices or services, such as the microservices 20, 24. The second service matrix 210, like the first service matrix 200, includes four columns of information, a first column 211 indicating an origin of a service request, a second column 212 indicating an operation being requested, a third column 213 being an end point of the request, and a fourth column 214 indicating which categories of operators have authorization. As shown, the second service matrix 210 includes authorization processes for internal and external origin service requests.

Figure 3C:
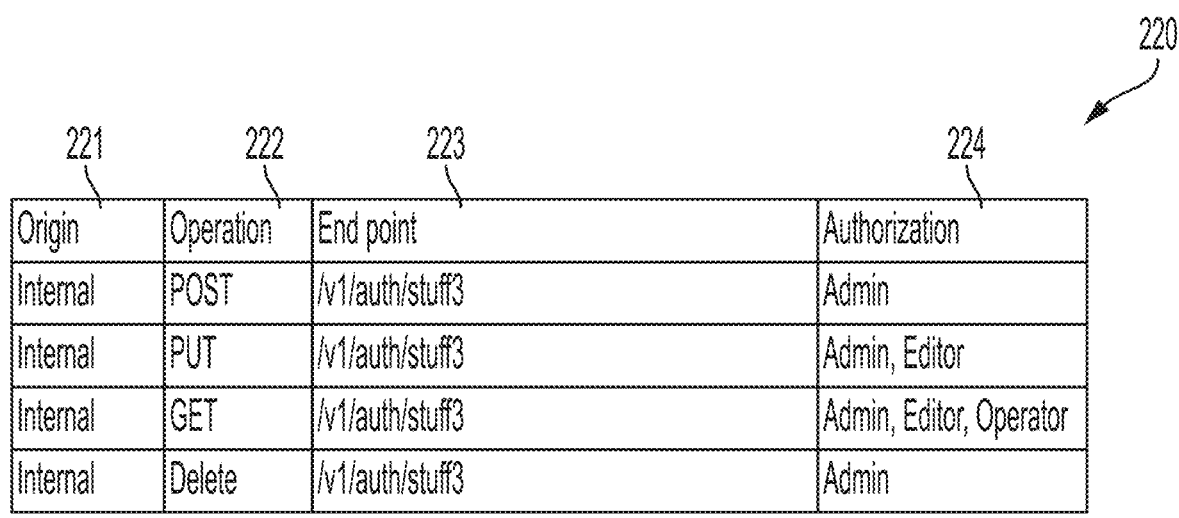
FIG. 3C depicts a third service matrix, in accordance with embodiments of the present invention.

FIG. 3C depicts a third service matrix 220, in accordance with embodiments of the present invention. The third service matrix 220 may represent a service matrix of the microservice 24 shown in FIG. 1. This information may be provided, published, transmitted or otherwise sent to the ingress computer system 16 for converging with other service matrices from other microservices or services, such as the microservices 20, 24. The second service matrix 210, like the first service matrix 200, includes four columns of information, a first column 211 indicating an origin of a service request, a second column 212 indicating an operation being requested, a third column 213 being an end point of the request, and a fourth column 214 indicating which categories of operators have authorization. As shown, the second service matrix 210 includes authorization processes for internal and external origin service requests.

While not shown, any microservice in the system 10, such as the microservices 34, 36, 38 may each include a service matrix similar to the service matrices 200, 210, 220 described hereinabove. The service matrices described herein may be provided by the microservices 20, 22, 24, 34, 36, 38 to the respective ingress computer systems 16, 30 and received thereby.

The service matrices provided to the respective ingress computer systems 16, 30 may be compiled thereby so that a label may be applied to any incoming request for service by the ingress computer systems 16, 30, in the manner described herein. The service matrices may be compiled as a dependency chain matrix by the ingress computer systems 16, 30, whereby the dependency chain matrix includes all of the information provided by each of the individual devices to the ingress computer systems 16, 30. In addition to compiling this information, the ingress computer systems 16, 30 may further have information related to inter cluster authorization, as shown in FIGS. 4A and 4B.

FIG. 4A depicts a first dependency chain matrix 250 for inter cluster authorization, in accordance with embodiments of the present invention. The first dependency chain matrix 250 may be a dependency chain matrix which compiles, converges, aggregates or otherwise puts together the service matrices provided to the first ingress computer system 16 for the first cluster 12. The first dependency chain matrix 250 includes columns of various resources. The matrix includes three rows of labels. For each of the various resources and for a given label, the columns are populated with authorization operation allowances. For example, for the resource/v1/storage, and the labels C1:221, C1:331, the authorization operation allowances may be for Read (R) and Update (U), but authorization is not provided for Create (C) or Delete (D). For each of the populated cells in the matrix, the various authorization types may comprise Create, Read, Update, Delete (CRUD) operations associated with a potential service request, however other authorization types may be used in other systems.

FIG. 4B depicts a second dependency chain matrix 260 for inter cluster authorization, in accordance with embodiments of the present invention. The second dependency chain matrix 260 may be a dependency chain matrix which compiles, converges, aggregates or otherwise puts together the service matrices provided to the second ingress computer system 30 for the second cluster 14. The second dependency chain matrix 260 includes columns of various resources. The matrix includes three rows of labels. For each of the various resources and for a given label, the columns are populated with authorization operation allowances. For example, for the resource/v1/cluster, and the labels C2:551, C2:661, there may be no authorization operation allowances for any CRUD operation. Similarly, for the resource/v1/node, and the label C2:552, the authorization operation allowances may be for Create (C), Read (R) and Update (U), but authorization is not provided for Delete (D).

The first and second dependency chain matrices 250, 260 may be used for inter cluster authorization, in the event the first cluster 12 would like to access a server in the second cluster 14, and vice versa. For example, if a service in the first cluster 12 would like to access a server in the second cluster 14, the ingress computer system 16 would attach a label particular to the second cluster 14 before sending the request to the second cluster 14. This label would be understood by the second cluster 14. Thus, when the two clusters 12, 14, and the ingress computer systems 16, 30 thereof, converge to form their dependency chain matrices 250, 260, the two clusters 12, 14 and the ingress computer systems 16, 30 thereof have exchanged labels to attach whenever a request goes from one cluster to another cluster. Thus, the present invention allows for information to be switched based on a label provided by the respective ingress computer system 16, 30, instead of requiring every request for authorization to be processed one hop (device) at a time.

Figure 5:
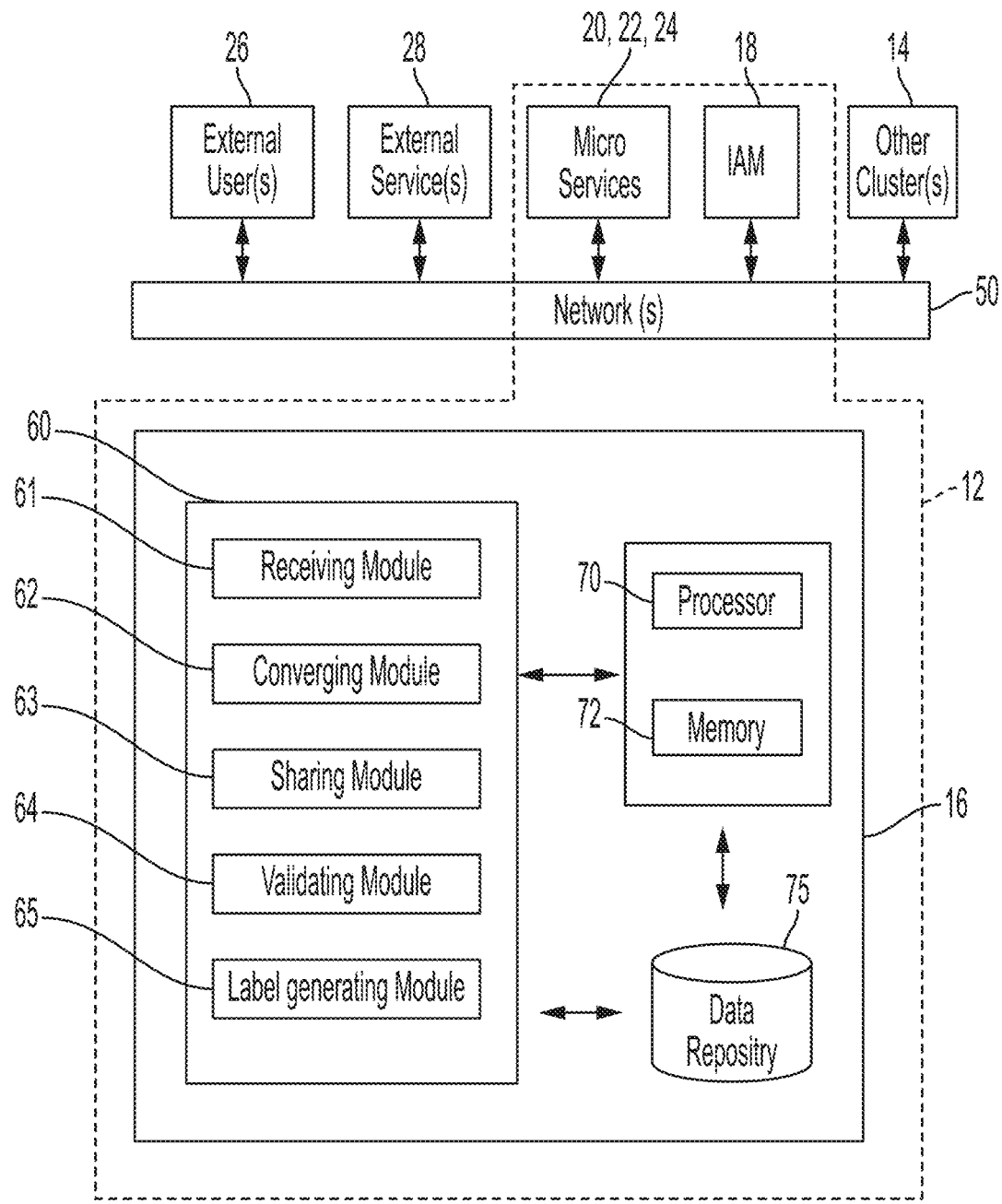
FIG. 5 depicts an ingress system of the system for authorization of a service request in a multi-cluster system of FIG. 1, in accordance with embodiments of the present invention.

FIG. 5 depicts the ingress computer system 16 of the system 10 for authorization of a service request in a multi-cluster system of FIG. 1, in accordance with embodiments of the present invention. As shown, the ingress computer system 16 is connectable over a network 50 to various other devices and systems within the system 10. The ingress computer system 16 is shown connected via the network(s) 50 to the external user 26 and the external service 28, as well as other clusters 16. The other clusters 16 may include the various features of a cluster shown in FIG. 1 including a separate ingress computer system or module, additional microservices and the like. The ingress computer system 16 is further incorporated into the first cluster 12 which also includes the microservices 20, 22, 24 and the IAM 18 connected over a cluster inclusive network of the network(s) 50.

The network(s) 50 may be any group of two or more computer systems linked together, and may include one or more separate networks. The network(s) 50 may represent, for example, the internet. The network(s) 50 may be any type of computer network known by individuals skilled in the art. Examples of computer networks which may be embodied by the network(s) 50 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network(s) 50 may be a peer-to-peer network in some embodiments, wherein in other embodiments, the network(s) 50 may be organized as a client/server architecture.

Embodiments of the ingress computer system 16 may include a module structure 60 that includes a receiving module 61, a converging module 62, and a sharing module 63, a validating module 64, and a label generating module 65. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines. The modules may each be separate components of the ingress computer system 16. In other embodiments, more than one module may be a single combined computer program, or hardware module. Moreover, the ingress computer system 16 may be a module portion of another computer system server, or computer infrastructure in some embodiments.

Embodiments of the receiving module 61 may include one or more components of hardware and/or software program code for obtaining, retrieving, collecting, or otherwise receiving information from the external users 26, the external services 28, micro services 20, 22, 24 in the cluster 12, IAM 18, or devices from other clusters 14. In an exemplary embodiment, the receiving module 61 may be configured to receive a dependency chain matrix from each of the service end points in a multi cluster system including the micro services 20, 22, 24. Moreover, the receiving module 61 may be configured to receive an updated dependency chain matrix from service endpoints based on triggering events, as discussed herein. Still further, the receiving module 61 may be configured to receive converged data matrices from other ingress computer systems from other clusters in a multi cluster system.

Referring still to FIG. 1, embodiments of the computer system 120 may further include the converging module 62.

Embodiments of the converging module 62 may include one or more components of hardware and/or software program code configured for converging the received dependency chain matrices into a converged data matrix, authorization table, dependency chain matrix, or the like, such as the matrices 250, 260 shown in FIGS. 4A and 4B. The converging module 62 may package the converged data matrix as a side car for implementation or publishing thereof by the sharing module 63.

Embodiments of the sharing module 63 may include one or more components of hardware and/or software program code for sharing, providing, transmitting, publishing or otherwise giving the converged data matrix authorization table, dependency chain matrix or the like as a side car module to each of the plurality of service end points in the cluster.

Embodiments of the validating module 64 may include one or more components of hardware and/or software program code for validating an authorization for a service request by, for example, attaching an appropriate label to a service request so that the label can be examined by the side car module provided at the service end points.

Embodiments of the label generating module 65 may include one or more components of hardware and/or software program code for generating labels for attaching to a service request consistent with the converged data matrix created by the converging module 62.

Referring still to FIG. 5, embodiments of the ingress computer system 16 may be equipped with a memory device 72 and a processor 70. The memory device 72 may store the information needed by a processor 70 to perform operations thereof. The processor 141 may be configured for implementing the tasks associated with the ingress computer system 16, described hereinabove.

Figure 6:
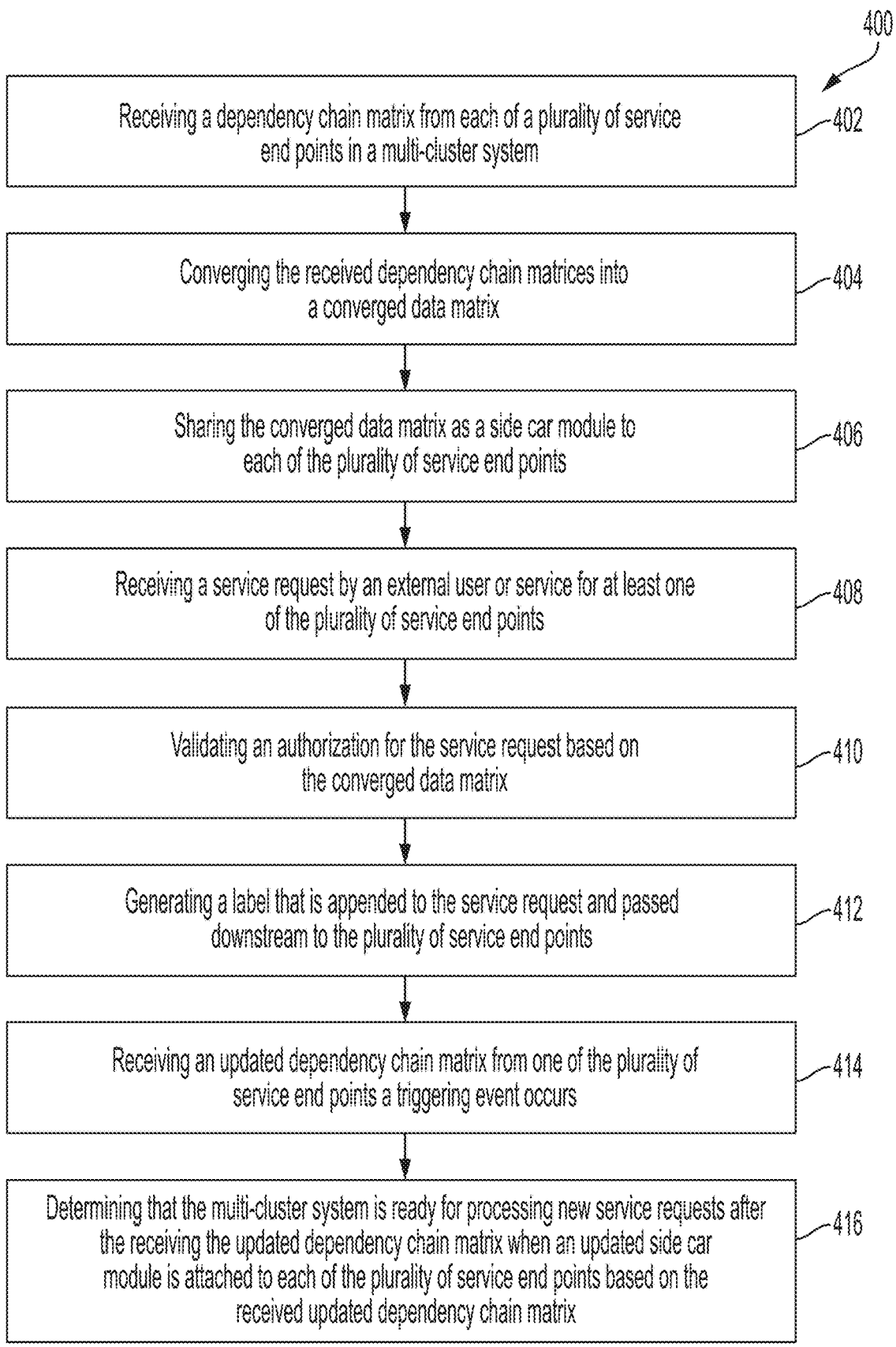
FIG. 6 depicts a method of authorization of a service request in a multi-cluster system, in accordance with embodiments of the present invention.

FIG. 6 depicts a method 400 of authorization of a service request in a multi-cluster system, in accordance with embodiments of the present invention. According to the method 400, a first step 402 includes receiving, by one or more processors of a computer system, such as the ingress computer system 14 or other ingress module, a dependency chain matrix, such as the dependency chain matrices 200, 210, 220, from each of a plurality of service end points, such as microservices 20, 22, 24, in a multi-cluster system, such as the multi-cluster system 10. The dependency chain matrix may include the plurality of service end points supported along with the authorization level and the operations allowed. Moreover, the step 402 may occur as part of a startup process. Moreover, each of the dependency chain matrices may include a service end point of the plurality of service end points, Create, Read, Update, Delete (CRUD) operations associated with a potential service request, a category for types of external users associated with the potential service request; an authorization label for appending to the potential service request.

The method 400 includes a step 404 of converging, by the one or more processors of the computer system, the received dependency chain matrices into a converged data matrix, such as the converged data matrix 250. The method 400 includes a step 406 of sharing, by the one or more processors of the computer system, the converged data matrix as a side car module, such as the side car module 140, to each of the plurality of service end points. The method 400 includes a step 408 of receiving, by the one or more processors of the computer system, a service request by an external user or service, such as the external user 26 or service 28, for at least one of the plurality of service end points. The method 400 includes a step 410 of validating, by the one or more processors of the computer system, an authorization for the service request based on the converged data matrix and a step 412 of generating, by the one or more processors of the computer system, a label that is appended to the service request and passed downstream to the plurality of service end points, such as the labels shown in FIGS. 4A-4B.

The method 400 may include a step 414 of receiving, by the one or more processors of the computer system, an updated dependency chain matrix from one of the plurality of service end points when a triggering event occurs. For example, the triggering event may be that the one of the plurality of service end points restarts, or that there is a change in service end points hosted by the one of the plurality of service end points; or that there is a change in the authorization requirements for the one of the plurality of service end points. Finally, the method 400 may include a step 416 of determining, by the one or more processors of the computer system, that the multi-cluster system is ready for processing new service requests after the receiving the updated dependency chain matrix when an updated side car module is attached to each of the plurality of service end points based on the received updated dependency chain matrix.

Figure 7:
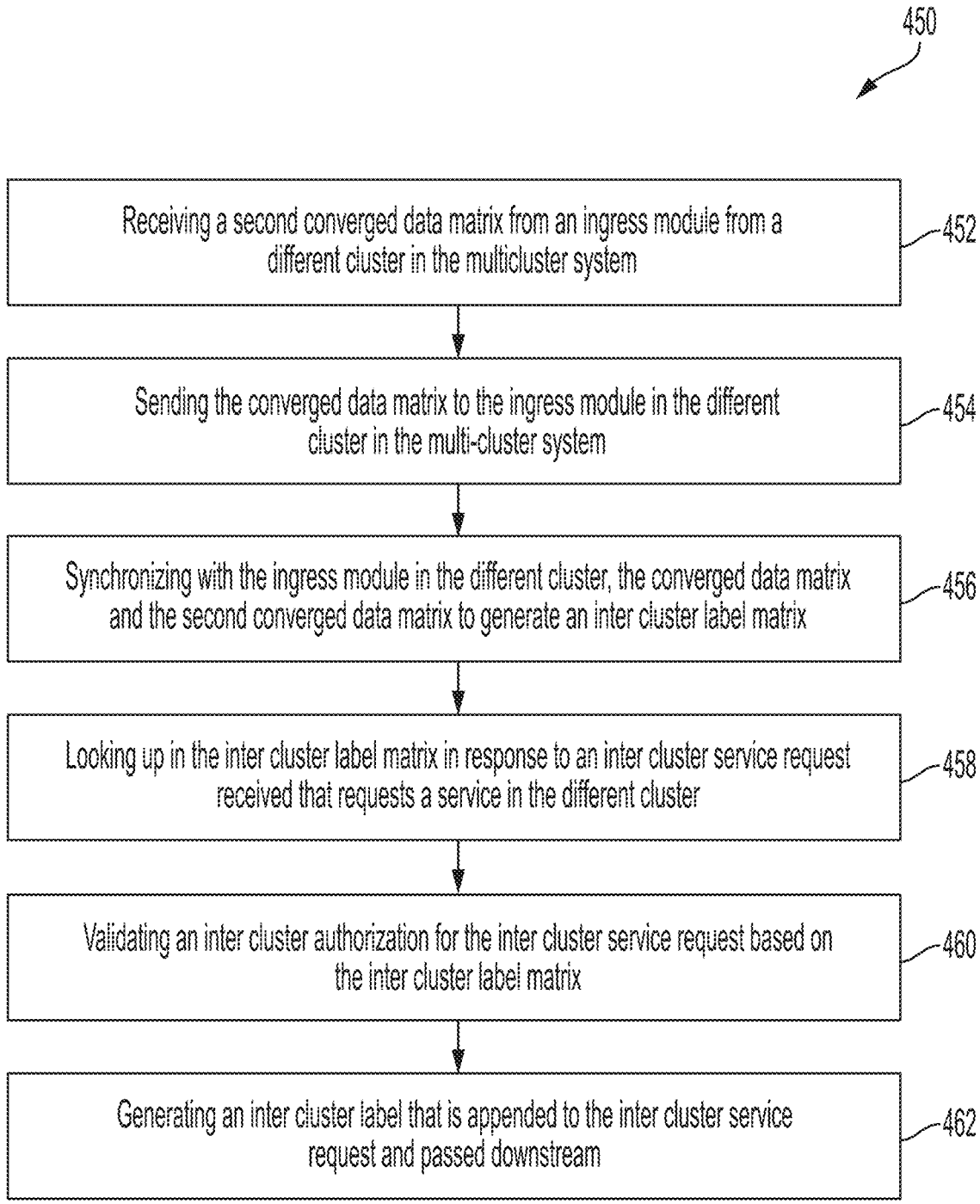
FIG. 7 depicts another method of authorization of a service request in a multi-cluster system, in accordance with embodiments of the present invention.

FIG. 7 depicts another method 450 of authorization of a service request in a multi-cluster system, in accordance with embodiments of the present invention. The method 450 may be a separate method from the method 400, or may be additional steps performable by the method 400 according to various embodiments contemplated herein. The method 450 includes a step 452 of receiving, by the one or more processors of the computer system, a second converged data matrix from an ingress module, such as the ingress module 30, from a different cluster in the multi-cluster system, such as the cluster 14. The method 450 may include a step 454 of sending, by the one or more processors of the computer system, the converged data matrix to the ingress module in the different cluster in the multi-cluster system. The method 450 may further include a step 456 of synchronizing, by the one or more processors of the computer system, with the ingress module in the different cluster, the converged data matrix and the second converged data matrix to generate an inter cluster label matrix.

Still further, the method 450 may include a step 458 of looking up, by the one or more processors of the computer system, in the inter cluster label matrix in response to an inter cluster service request received that requests a service in the different cluster, and a step 460 of validating, by the one or more processors of the computer system, an inter cluster authorization for the inter cluster service request based on the inter cluster label matrix. Finally, the method 450 may include a step 462 of generating, by the one or more processors of the computer system, an inter cluster label that is appended to the inter cluster service request and passed downstream.

Figure 8:
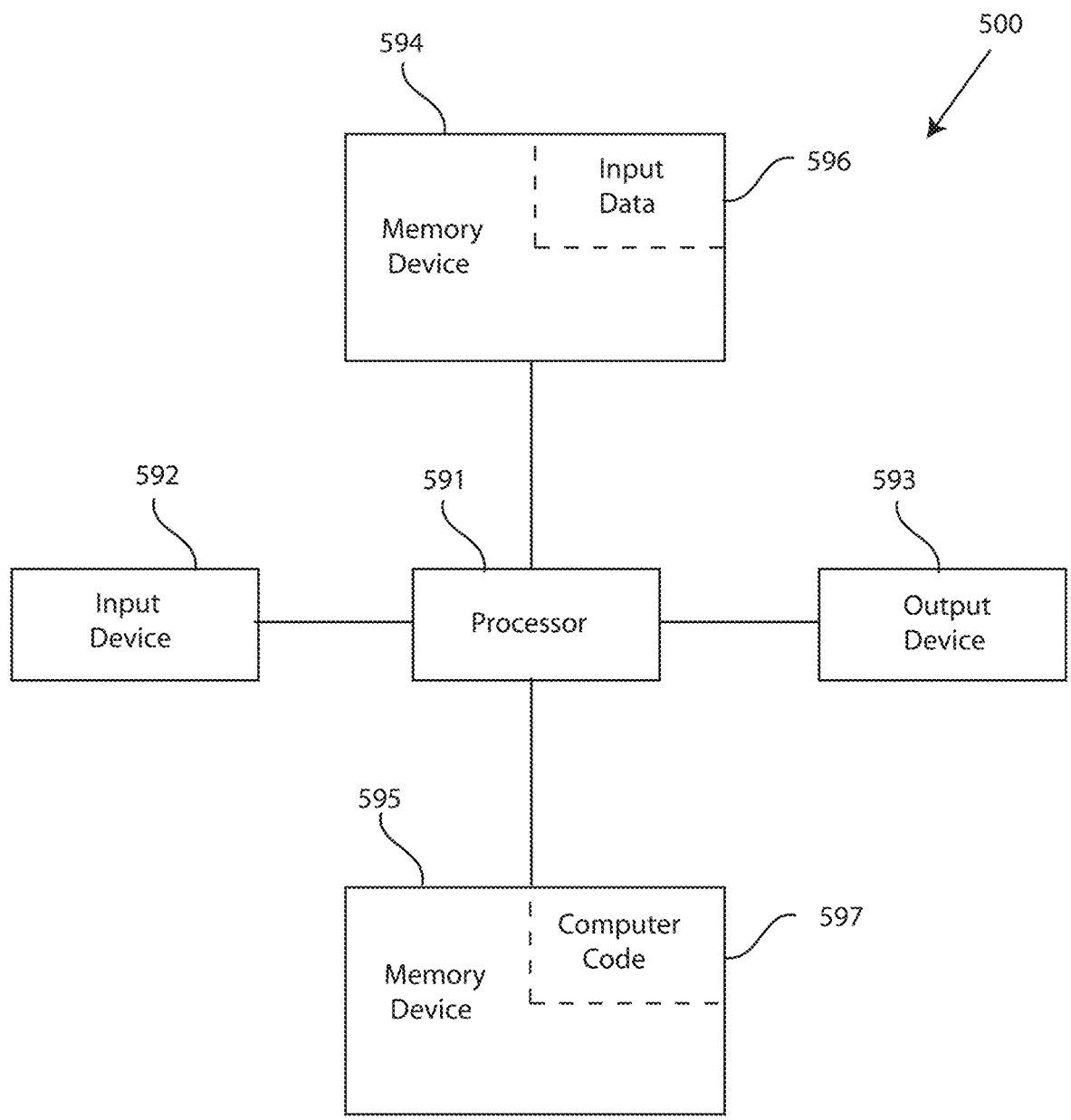
FIG. 8 depicts a block diagram of a computer system for the system and engine of FIGS. 1 and 5, capable of implementing methods such as those of FIGS. 2, 6 and 7, in accordance with embodiments of the present invention.

FIG. 8 illustrates a block diagram of a computer system 500 for the system 10 or the computer system 100 of FIGS. 1 and 3, capable of implementing methods such as those of FIGS. 2, 6 and 7, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code

597 for the tools and programs capable of implementing methods of authorization of a service request in a multi-cluster system, in the manner prescribed by the embodiments of FIGS. 2, 6 and 7 using the system of authorization of a service request in a multi-cluster system FIGS. 1 and 3, wherein the instructions of the computer code 597 may be executed by processor 591 via memory device 595. The computer code 597 may include software or program instructions that may implement one or more algorithms for implementing the methods of implementing methods of authorization of a service request in a multi-cluster system, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 8.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 75 as shown in FIG. 5.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods of authorization of a service request in a multi-cluster system. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to provide a system of authorization of a service request in a multi-cluster system. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method of authorization of a service request in a multi-cluster system. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method of authorization of a service request in a multi-cluster system.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
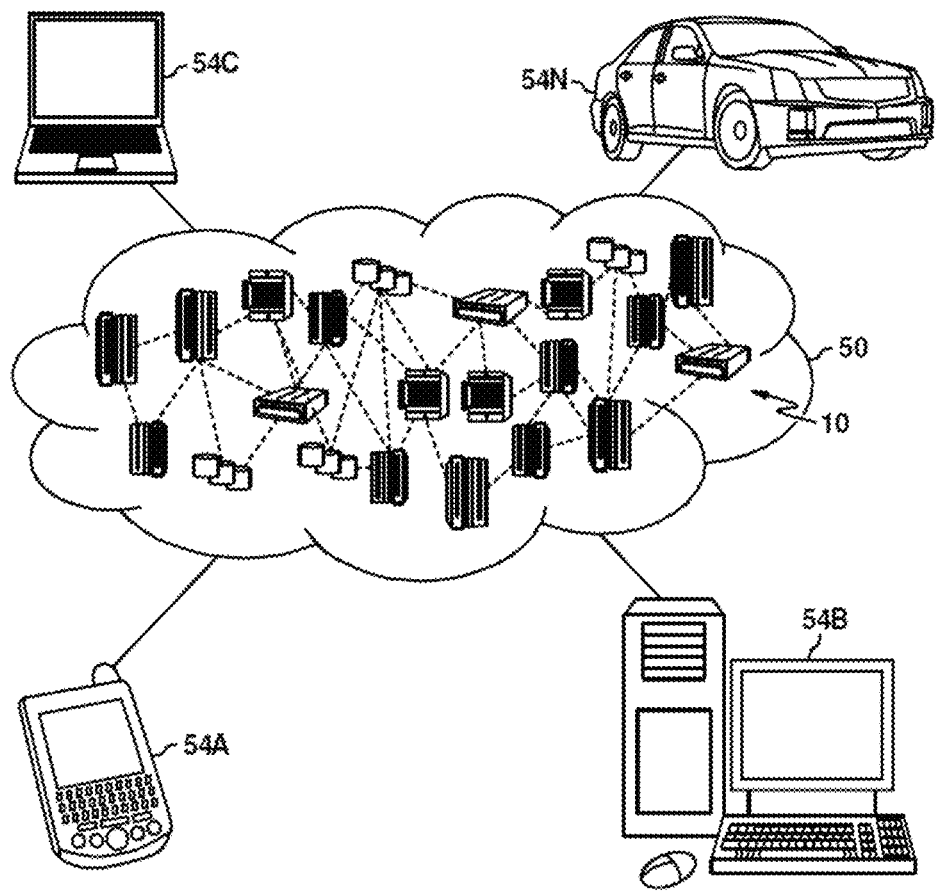
FIG. 9 depicts a cloud computing environment, in accordance with embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 9 are intended to be illustrative only and that computing nodes 10 and cloud computing environment 50 can communicate with any type of computerized device over any type of network and/or network addressable connection (e.g., using a web browser).

Figure 10:
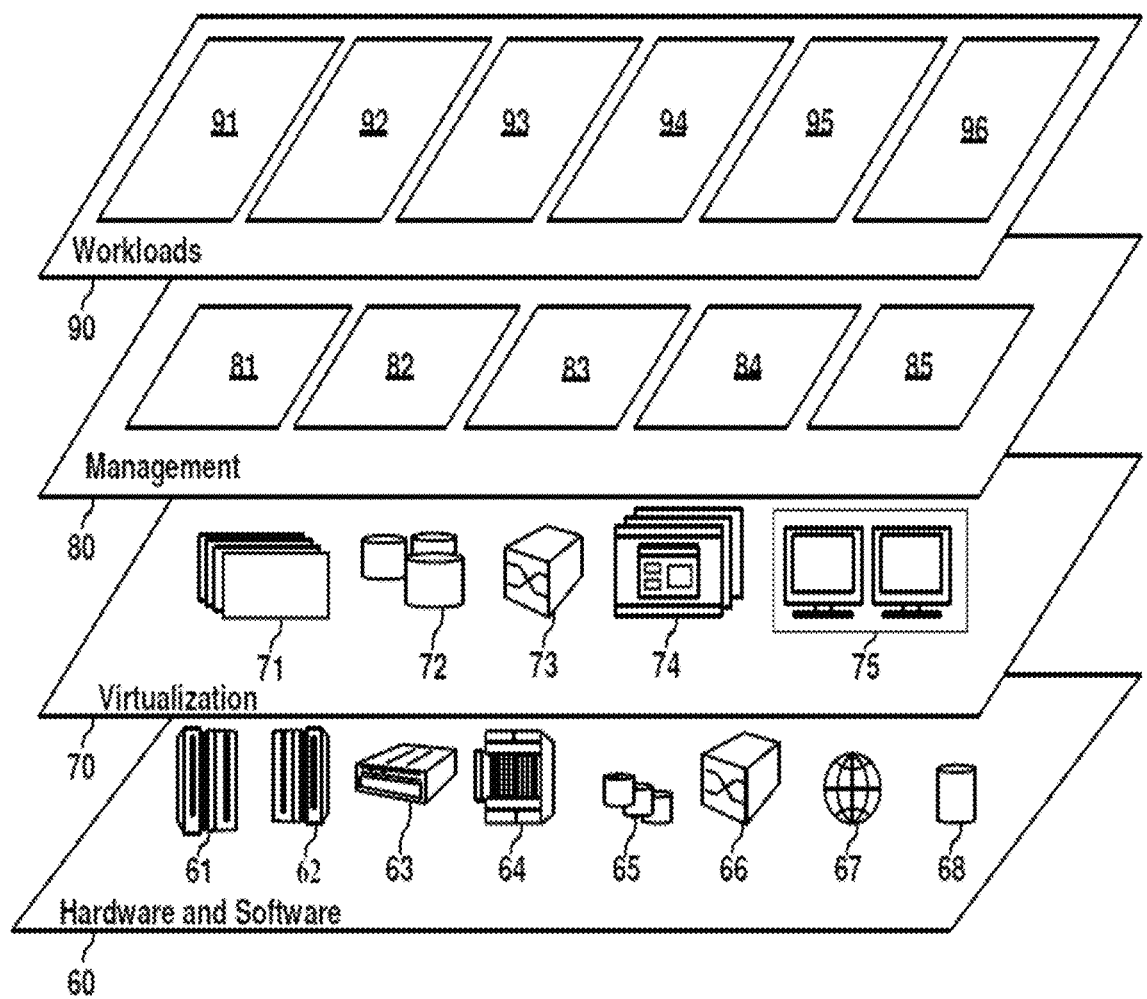
FIG. 10 depicts abstraction model layers, in accordance with embodiments of the present invention.

Referring now to FIG. 10, a set of functional abstraction layers provided by cloud computing environment 50 (see FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: sending and receiving 91; converging 92; validating 93; authorizing 94; label generation 95; and side care sharing 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   receiving, by one or more processors of a computer system, a dependency chain matrix from each of a plurality of service end points in a multi-cluster system;
   converging, by the one or more processors of the computer system, the received dependency chain matrices into a converged data matrix;
   sharing, by the one or more processors of the computer system, the converged data matrix as a side car module to each of the plurality of service end points;
   receiving, by the one or more processors of the computer system, a service request by an external user or service for at least one of the plurality of service end points;
   validating, by the one or more processors of the computer system, an authorization for the service request based on the converged data matrix; and
   generating, by the one or more processors of the computer system, a label that is appended to the service request and passed downstream to the plurality of service end points.

2. The method of claim 1, wherein the dependency chain matrix includes the plurality of service end points supported along with the authorization level and the operations allowed and wherein the receiving, by the one or more processors of the computer system, the dependency chain matrix from each of the plurality of service end points in the multi-cluster system occurs as part of a startup process.

3. The method of claim 1, further comprising:
   receiving, by the one or more processors of the computer system, an updated dependency chain matrix from one of the plurality of service end points when:
   the one of the plurality of service end points restarts;
   there is a change in service end points hosted by the one of the plurality of service end points; or
   there is a change in the authorization requirements for the one of the plurality of service end points.

4. The method of claim 1, wherein each of the dependency chain matrices includes:
   a service end point of the plurality of service end points;
   Create, Read, Update, Delete (CRUD) operations associated with a potential service request;
   a category for types of external users associated with the potential service request; and
   an authorization label for appending to the potential service request.

5. The method of claim 4, further comprising:
   determining, by the one or more processors of the computer system, that the multi-cluster system is ready for processing new service requests after the receiving the updated dependency chain matrix when an updated side car module is attached to each of the plurality of service end points based on the received updated dependency chain matrix.

6. The method of claim 1, further comprising:
   receiving, by the one or more processors of the computer system, a second converged data matrix from an ingress module from a different cluster in the multi-cluster system;
   sending, by the one or more processors of the computer system, the converged data matrix to the ingress module in the different cluster in the multi-cluster system; and
   synchronizing, by the one or more processors of the computer system, with the ingress module in the different cluster, the converged data matrix and the second converged data matrix to generate an inter cluster label matrix.

7. The method of claim 6, further comprising:
   looking up, by the one or more processors of the computer system, in the inter cluster label matrix in response to an inter cluster service request received that requests a service in the different cluster;
   validating, by the one or more processors of the computer system, an inter cluster authorization for the inter cluster service request based on the inter cluster label matrix; and
   generating, by the one or more processors of the computer system, an inter cluster label that is appended to the inter cluster service request and passed downstream.

8. A computer system, comprising:
   one or more processors;
   one or more memory devices coupled to the one or more processors; and
   one or more computer readable storage devices coupled to the one or more processors, wherein the one or more storage devices contain program code executable by the one or more processors via the one or more memory devices to implement a method for authorization of a service request in a multi-cluster system, the method comprising:
   receiving, by one or more processors of a computer system, a dependency chain matrix from each of a plurality of service end points in a multi-cluster system;
   converging, by the one or more processors of the computer system, the received dependency chain matrices into a converged data matrix;

sharing, by the one or more processors of the computer system, the converged data matrix as a side car module to each of the plurality of service end points;
receiving, by the one or more processors of the computer system, a service request by an external user or service for at least one of the plurality of service end points;
validating, by the one or more processors of the computer system, an authorization for the service request based on the converged data matrix; and
generating, by the one or more processors of the computer system, a label that is appended to the service request and passed downstream to the plurality of service end points.

9. The computer system of claim 8, wherein the dependency chain matrix includes the plurality of service end points supported along with the authorization level and the operations allowed and wherein the receiving, by the one or more processors of the computer system, the dependency chain matrix from each of the plurality of service end points in the multi-cluster system occurs as part of a startup process.

10. The computer system of claim 8, the method further comprising:
receiving, by the one or more processors of the computer system, an updated dependency chain matrix from one of the plurality of service end points when:
the one of the plurality of service end points restarts;
there is a change in service end points hosted by the one of the plurality of service end points; or
there is a change in the authorization requirements for the one of the plurality of service end points.

11. The computer system of claim 10, the method further comprising:
determining, by the one or more processors of the computer system, that the multi-cluster system is ready for processing new service requests after the receiving the updated dependency chain matrix when an updated side car module is attached to each of the plurality of service end points based on the received updated dependency chain matrix.

12. The computer system of claim 8, wherein each of the dependency chain matrices includes:
a service end point of the plurality of service end points;
Create, Read, Update, Delete (CRUD) operations associated with a potential service request;
a category for types of external users associated with the potential service request; and
an authorization label for appending to the potential service request.

13. The computer system of claim 8, the method further comprising:
receiving, by the one or more processors of the computer system, a second converged data matrix from an ingress module from a different cluster in the multi-cluster system;
sending, by the one or more processors of the computer system, the converged data matrix to the ingress module in the different cluster in the multi-cluster system; and
synchronizing, by the one or more processors of the computer system, with the ingress module in the different cluster, the converged data matrix and the second converged data matrix to generate an inter cluster label matrix.

14. The computer system of claim 13, the method further comprising:
looking up, by the one or more processors of the computer system, in the inter cluster label matrix in response to an inter cluster service request received that requests a service in the different cluster;
validating, by the one or more processors of the computer system, an inter cluster authorization for the inter cluster service request based on the inter cluster label matrix; and
generating, by the one or more processors of the computer system, an inter cluster label that is appended to the inter cluster service request and passed downstream.

15. A computer program product for authorization of a service request in a multi-cluster system, the computer program product comprising:
one or more computer readable storage media having computer readable program code collectively stored on the one or more computer readable storage media, the computer readable program code being executed by one or more processors of a computer system to cause the computer system to perform a method comprising:
receiving, by one or more processors of a computer system, a dependency chain matrix from each of a plurality of service end points in a multi-cluster system;
converging, by the one or more processors of the computer system, the received dependency chain matrices into a converged data matrix;
sharing, by the one or more processors of the computer system, the converged data matrix as a side car module to each of the plurality of service end points;
receiving, by the one or more processors of the computer system, a service request by an external user or service for at least one of the plurality of service end points;
validating, by the one or more processors of the computer system, an authorization for the service request based on the converged data matrix; and
generating, by the one or more processors of the computer system, a label that is appended to the service request and passed downstream to the plurality of service end points.

16. The computer program product of claim 15, wherein the dependency chain matrix includes the plurality of service end points supported along with the authorization level and the operations allowed and wherein the receiving, by the one or more processors of the computer system, the dependency chain matrix from each of the plurality of service end points in the multi-cluster system occurs as part of a startup process.

17. The computer program product of claim 15, the method further comprising:
receiving, by the one or more processors of the computer system, an updated dependency chain matrix from one of the plurality of service end points when:
the one of the plurality of service end points restarts;
there is a change in service end points hosted by the one of the plurality of service end points; or
there is a change in the authorization requirements for the one of the plurality of service end points.

18. The computer program product of claim 15, wherein each of the dependency chain matrices includes:
a service end point of the plurality of service end points;
Create, Read, Update, Delete (CRUD) operations associated with a potential service request;

a category for types of external users associated with the potential service request; and an authorization label for appending to the potential service request.

19. The computer program product of claim 15, the method further comprising:

receiving, by the one or more processors of the computer system, a second converged data matrix from an ingress module from a different cluster in the multi-cluster system;

sending, by the one or more processors of the computer system, the converged data matrix to the ingress module in the different cluster in the multi-cluster system; and synchronizing, by the one or more processors of the computer system, with the ingress module in the different cluster, the converged data matrix and the second converged data matrix to generate an inter cluster label matrix.

20. The computer program product of claim 19, the method further comprising:

looking up, by the one or more processors of the computer system, in the inter cluster label matrix in response to an inter cluster service request received that requests a service in the different cluster; = validating, by the one or more processors of the computer system, an inter cluster authorization for the inter cluster service request based on the inter cluster label matrix; and generating, by the one or more processors of the computer system, an inter cluster label that is appended to the inter cluster service request and passed downstream.

* * * * *